(12) United States Patent
Yamamoto

(10) Patent No.: US 10,004,020 B2
(45) Date of Patent: Jun. 19, 2018

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Tetsuya Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/613,931

(22) Filed: Jun. 5, 2017

(65) Prior Publication Data
US 2017/0359764 A1 Dec. 14, 2017

(30) Foreign Application Priority Data
Jun. 8, 2016 (JP) .................................. 2016-114714

(51) Int. Cl.
*H04W 36/32* (2009.01)
*H04W 72/04* (2009.01)
*H04W 24/02* (2009.01)
*H04W 72/02* (2009.01)
*H04W 16/14* (2009.01)

(52) U.S. Cl.
CPC .......... *H04W 36/32* (2013.01); *H04W 16/14* (2013.01); *H04W 24/02* (2013.01); *H04W 72/02* (2013.01); *H04W 72/048* (2013.01); *H04W 72/0453* (2013.01)

(58) Field of Classification Search
CPC ...... H04W 36/32; H04W 16/14; H04W 24/02; H04W 72/0453; H04W 72/048
See application file for complete search history.

(56) References Cited

U.S. PATENT DOCUMENTS

| 3,309,706 A * | 3/1967 | Huggins ................. H01Q 3/34 342/371 |
| 7,671,789 B1 * | 3/2010 | Yu ....................... G01S 13/4463 342/152 |
| 9,594,153 B1 * | 3/2017 | Oroskar ................ H04W 24/00 |

FOREIGN PATENT DOCUMENTS

| JP | 4463304 B2 | 5/2010 |
| JP | 2010-278825 A | 12/2010 |

* cited by examiner

*Primary Examiner* — Jaison Joseph
(74) *Attorney, Agent, or Firm* — Carter, DeLuca, Farrell & Schmidt, LLP

(57) ABSTRACT

A communication apparatus having a plurality of antennas uses a predetermined frequency channel to perform communication, adjusts beamforming for transmission/reception by setting a weighting coefficient for each of the plurality of antennas, monitors to detect a radar signal outputted from another communication apparatus by using the predetermined frequency channel in a beamforming state formed in accordance with the weighting coefficients, and determines whether or not a reception level of the radar signal is greater than or equal to a predetermined threshold. When it is determined that the reception level of the radar signal is greater than or equal to the predetermined threshold, the communication apparatus changes the weighting coefficients, and uses the predetermined frequency channel in a beamforming state formed in accordance with the changed weighting coefficients to perform communication.

15 Claims, 8 Drawing Sheets

COMMUNICATION APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to a communication apparatus, a method of controlling the same, and a non-transitory computer-readable storage medium.

Description of the Related Art

In recent years, wireless LAN (Local Area Network) is being used in order to share information and effectively use devices such as a printer when constructing a system comprising a plurality of computers. Since it is unnecessary to install a LAN cable for a wireless LAN, it can be considered that wireless LAN will be used more and more in the future since the convenience of portable information processing apparatuses such as notebook type PCs can be effectively taken advantage of.

Note, it is necessary that a wireless communication apparatus is equipped with a DFS (Dynamic Frequency Selection) function (Japanese Patent Laid-Open No. 2010-278825) in wireless communication systems that use 5.3 GHz and 5.6 GHz band channels. In the DFS function is included an operation in which prior to using a frequency channel, the channel is monitored for 1 minute, and only after confirming that various radar signals are not detected is usage of the channel started. Note, in addition to the wireless LAN described above, LTE (Long Term Evolution)-LAA (License-Assisted Access) and the like are used in wireless communication systems that use 5.3 GHz and 5.6 GHz band channels. LTE-LAA is LTE communication in which an unlicensed frequency band is used for LTE.

Also, a beamforming technique for causing the directionality of a beam of a wireless communication apparatus antenna to dynamically change is known (Japanese Patent No. 4463304).

However, counter-measures for when a beamforming-enabled wireless communication apparatus uses 5.3 GHz and 5.6 GHz band channels have not been considered in the conventional technique.

SUMMARY OF THE INVENTION

The present invention was made in view of the problem described above and provides a technique for efficiently performing communication in a channel in which a beamforming-enabled wireless communication apparatus can detect a radar signal.

According to one aspect of the present invention, there is provided a communication apparatus having a plurality of antennas, which comprises: a communication unit configured to use a predetermined frequency channel to perform communication; an adjustment unit configured to adjust beamforming for transmission/reception by setting a weighting coefficient for each of the plurality of antennas; a detection unit configured to monitor to detect a radar signal outputted from another communication apparatus by using the predetermined frequency channel in a beamforming state formed in accordance with the weighting coefficients; and a determination unit configured to determine whether or not a reception level of the radar signal detected by the detection unit is greater than or equal to a predetermined threshold, wherein in a case when it is determined by the determination unit that the reception level of the radar signal detected by the detection unit is greater than or equal to the predetermined threshold, the adjustment unit changes the weighting coefficients, and the communication unit uses the predetermined frequency channel in a beamforming state formed in accordance with the changed weighting coefficients to perform communication.

Further features of the present invention will become apparent from the following description of exemplary embodiments (with reference to the attached drawings).

DESCRIPTION OF THE EMBODIMENTS

Below, with reference to the attached drawings, a detailed description is given for the present invention based on the embodiments. Note that the configuration illustrated in the following embodiment is merely one example, and the present invention is not limited to the illustrated configuration.

First Embodiment

Figure 1:
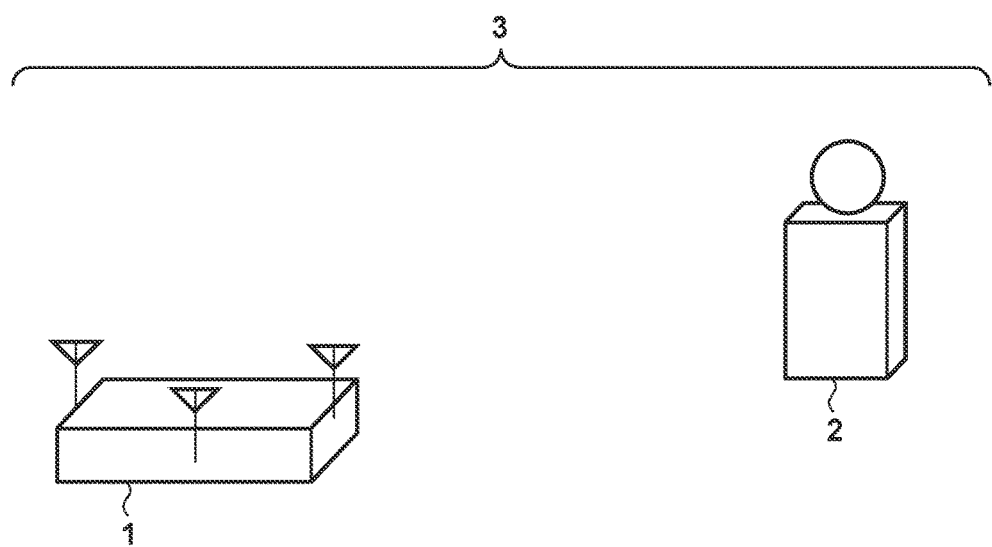
FIG. 1 illustrates a configuration of a communication system in a first embodiment.

FIG. 1 illustrates a configuration of a communication system 3 in a first embodiment. The communication system 3 is configured from a communication apparatus 1 and a weather radar 2, and the communication apparatus 1 is equipped with a DFS function, and monitors a channel to be used for an existence or absence of radar signals outputted from the weather radar 2, and in a case when no such radar signal is found, starts communication using the channel.

Figure 2:
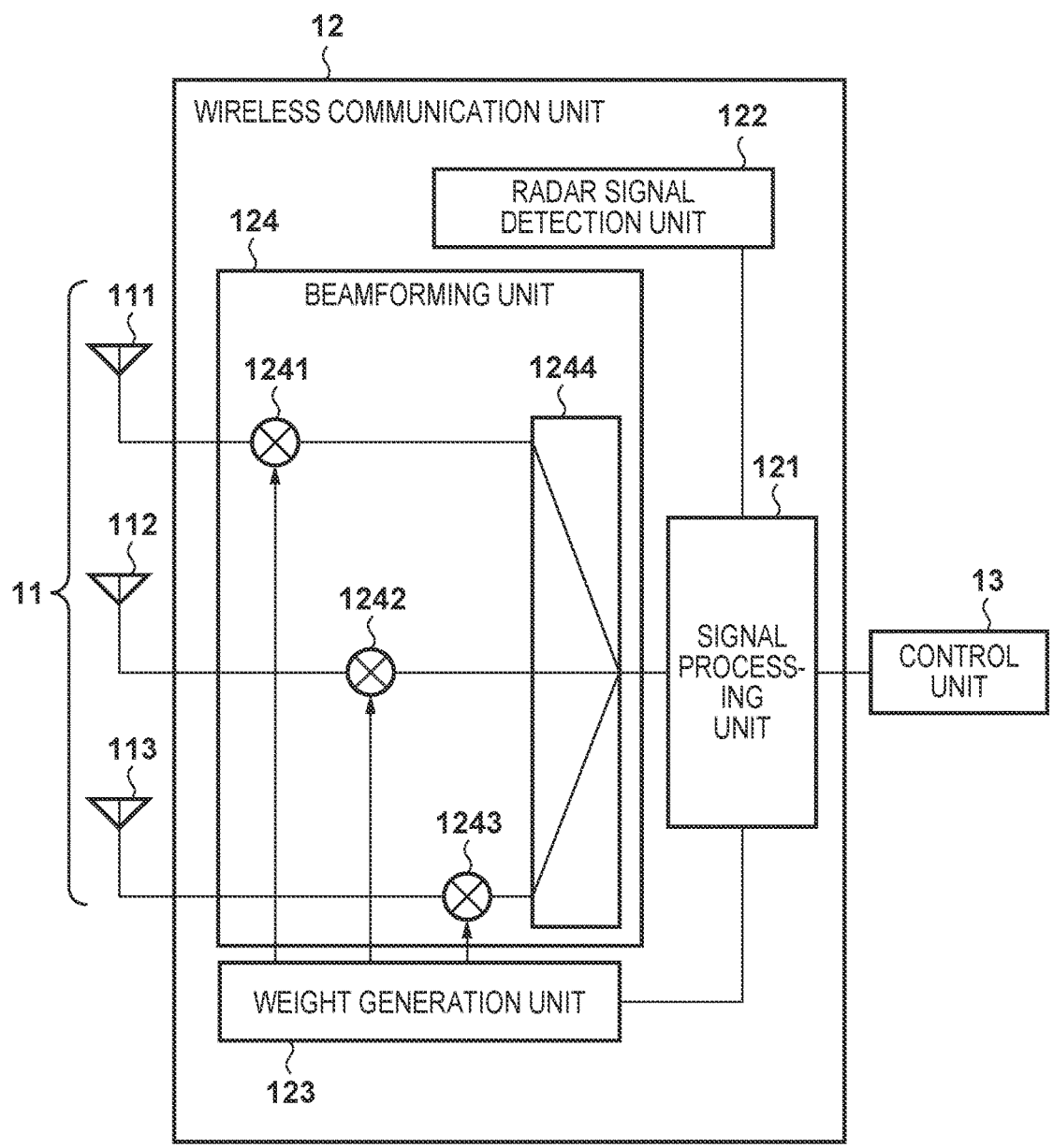
FIG. 2 illustrates a configuration of a communication apparatus in a first embodiment.

FIG. 2 illustrates a configuration of the communication apparatus 1 in the present embodiment. The communication apparatus 1 has antennas 11, a wireless communication unit 12, and a control unit 13. Antennas 111, 112, and 113 are used for transmission and reception of signals. The wireless communication unit 12 has a signal processing unit 121, a radar signal detection unit 122, a weight generation unit 123, and a beamforming unit 124. Details of the wireless communication unit 12 are described later. The control unit 13 controls the wireless communication unit 12 in addition to performing an exchange of digital data with the wireless communication unit 12.

The configuration of the wireless communication unit 12 is described in more detail. The signal processing unit 121 performs various signal processes. For example, the signal processing unit 121 performs a digital-to-analog conversion, an upconversion, and the like for signals received via the control unit 13 in a transmission system. Also, the signal processing unit 121 performs a downconversion, an analog-to-digital conversion, and the like for a signal outputted from the beamforming unit 124 in a reception system. Also, the signal processing unit 121 controls the radar signal detection unit 122 and the weight generation unit 123.

The radar signal detection unit 122 detects a radar signal outputted from the weather radar 2 based on a signal outputted from the signal processing unit 121. The weight generation unit 123 generates weighting coefficients (weights) for signals transmitted/received via the antennas 111, 112, and 113. Note, a weighting coefficient for at least amplitude is included in these weighting coefficient.

The beamforming unit 124 has weighting units 1241, 1242, and 1243 and a distribution/combination unit 1244. The weighting units 1241, 1242, and 1243 use the weighting coefficients outputted from the weight generation unit 123 to perform a weighting in relation to transmission signals. For example, the weighting units 1241, 1242, and 1243 multiply the weighting coefficients with the signals outputted from the antennas 111, 112, and 113. The weighting units 1241, 1242, and 1243 can also use the weighting coefficients outputted from the weight generation unit 123 to perform a weighting in relation to signals received via the antennas 111, 112, and 113. The distribution/combination unit 1244 distributes the signal outputted from the signal processing unit 121 to the antennas 111, 112, and 113 in the transmission system and combines a plurality of signals to which the weighting is applied in the reception system.

The weighting coefficient that the weight generation unit 123 generates encompasses a weighting coefficient for amplitude as described above. The amplitude and phase of the signals outputted from the antennas 111, 112, and 113 are controlled in accordance with the weighting by the weighting units 1241, 1242, and 1243 in the transmission system. By this, it becomes possible to adjust the form of transmission/reception beams and the gain of transmission/reception beams.

Figure 3:
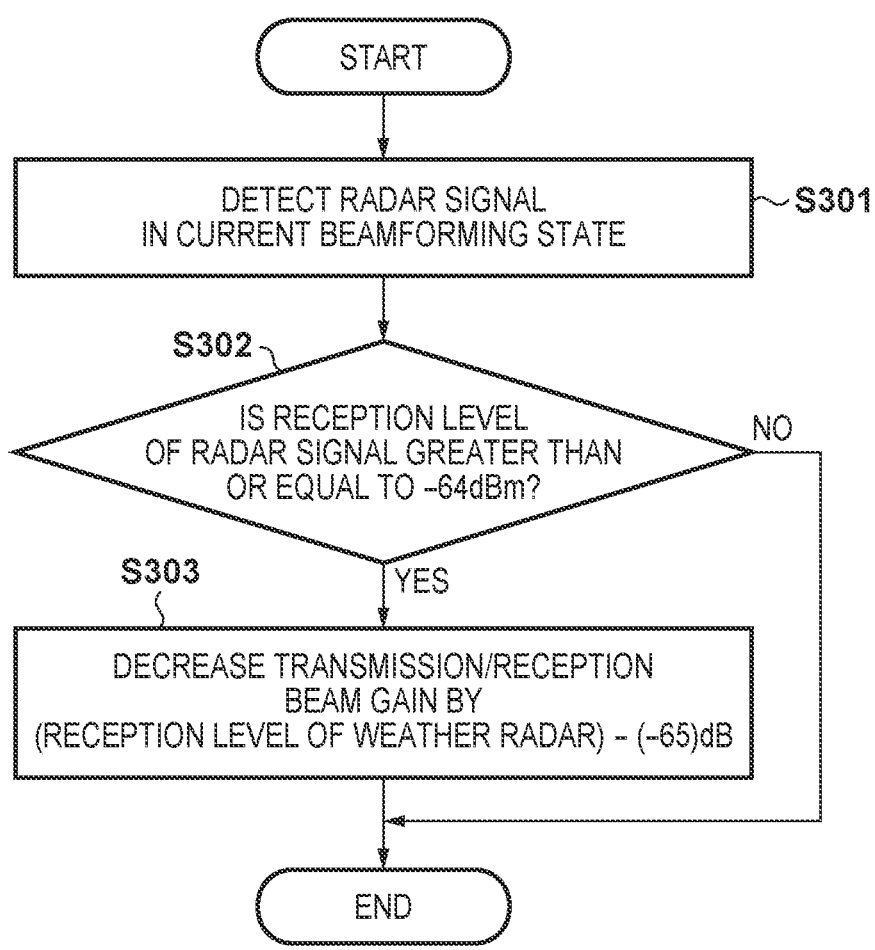
FIG. 3 is a flowchart for describing an operation in the first embodiment.

Next, an operation of the communication apparatus 1 in the present embodiment is described with reference to FIG. 3. FIG. 3 is a flowchart for describing an operation of the communication apparatus 1 in the present embodiment. The communication apparatus 1 starts the processing illustrated in FIG. 3 in accordance with a radar signal being detected by the radar signal detection unit 122. Note, it is assumed that the weight generation unit 123 generates predetermined weighting coefficients and the communication apparatus 1 performs the processing illustrated in FIG. 3 in a state in which a beam is formed in accordance with the weighting coefficients (a current beamforming state) in the present embodiment. Also, it is assumed that a frequency channel to be used is set in advance in the communication apparatus 1.

Also, the maximum output of the communication apparatus 1 is assumed to be greater than or equal to 200 mW. At that time, a threshold of the reception level of the radar signal for the communication apparatus 1 to execute a DFS function is defined to be greater than or equal to −64 dBm in Japan. Specifically, it is necessary for the communication apparatus 1 to execute the DFS function if the reception level of the radar signal is greater than or equal to −64 dBm. Note, a threshold of the reception level of the radar signal for executing the DFS function when the maximum output is less than 200 mW is defined to be −62 dBm.

It is assumed that in the communication apparatus 1, the weighting coefficients generated by the weight generation unit 123 as the current beamforming state are 50, 30, and 20 for the antennas 111, 112, and 113 respectively. The weighting coefficients correspond to the degree of weighting for the amplitudes of the signals outputted from the antennas 111, 112, and 113. Note, the maximum value of the total of weighting coefficients is set to be 100 for each of the plurality of antennas. Also, these weighting coefficients correspond to the degree of weighting for the amplitudes of the signals received from the antennas 111, 112, and 113.

The processing is advanced to step S302 when the communication apparatus 1 detects a radar signal in the current beamforming state by the radar signal detection unit 122 using the channel to be used (step S301). Note, the communication apparatus 1 starts communication in the current beamforming state by using that channel in a case when the radar signal is not detected. The signal processing unit 121, in step S302, determines whether or not the reception level of the detected radar signal is greater than or equal to −64 dBm which is the threshold for executing the DFS function. In a case when the reception level of the radar signal is greater than or equal to the threshold (Yes in step S302), the processing is advanced to step S303, and in a case when it is less than the threshold (No in step S302), the processing finishes and the communication apparatus 1 starts using the channel in the current beamforming state. Also, the weight generation unit 123 generates weighting coefficients so as to cause the transmission/reception beam gain to decrease by the difference between the reception level of the radar signal and the threshold based on an instruction from the signal processing unit 121 in step S303. Specifically, the weight generation unit 123 generates weighting coefficients so as to cause the transmission/reception beam gain to decrease by (reception level of the radar signal)−(−65) dB.

A case in which the reception level of the radar signal is −62 dBm is considered as one example. In such a case, the processing is advanced to step S303 in FIG. 3. The weight generation unit 123 decides that the transmission/reception beam gain is to be decreased by −62−(−65)=3 dB. Because the 3 dB decrease is a relative ratio of ½, the weight generation unit 123 multiplies the weighting coefficients 50, 30, and 20 by ½ for the antennas 111, 112, and 113, and these change to 25, 15, and 10 respectively. By this, the reception level of the radar signal that the communication apparatus 1 received is decreased to −65 dBm.

In this way, in the present embodiment, weighting coefficients are generated so that the reception level of the radar signal, which is received in a predetermined beamforming state using a frequency channel to be used, becomes less than the threshold for executing the DFS function. For this reason, it is possible for the channel to be used in the beamforming state by changing the transmission/reception beam gain, even in a case in which the radar signal is detected in the beamforming state.

Second Embodiment

Figure 4:
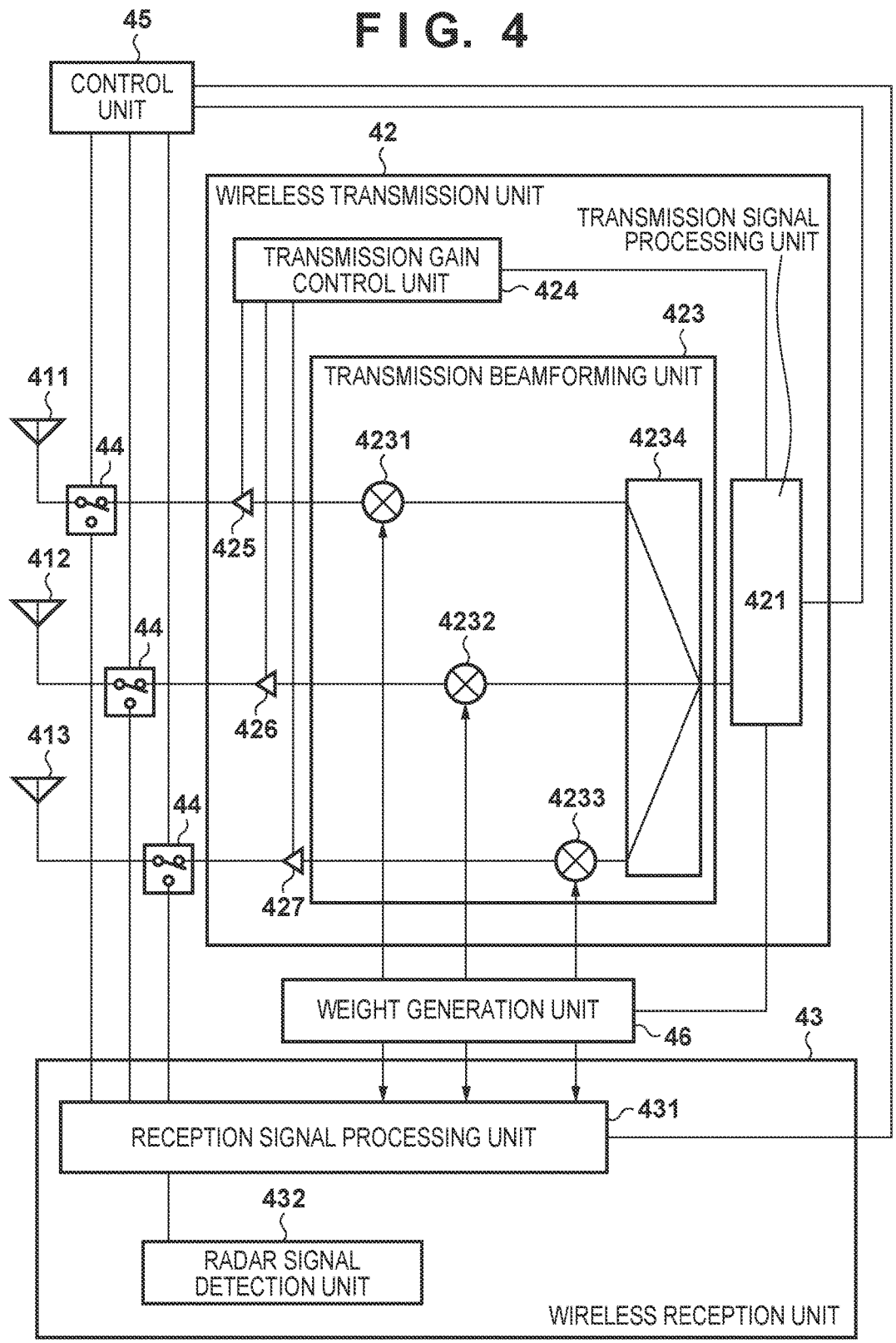
FIG. 4 illustrates a configuration of a communication apparatus in a second embodiment.

A second embodiment will be described giving points of difference with the first embodiment. FIG. 4 illustrates a configuration of the communication apparatus 1 in the present embodiment. The communication apparatus 1 has antennas 411, 412, and 413, a wireless transmission unit 42, a wireless reception unit 43, switches 44, a control unit 45, and a weight generation unit 46. The antennas 411, 412, and 413 are used for transmission and reception of signals similarly to the antennas 111, 112, and 113 of the communication apparatus 1 in the first embodiment. Details of the wireless transmission unit 42 and the wireless reception unit 43 are described later. The switches 44 are switches for switching connections to the wireless transmission unit 42 or the wireless reception unit 43 of the antennas 411, 412, and 413. The control unit 45 exchanges digital data with the wireless transmission unit 42 and the wireless reception unit 43 and controls the wireless transmission unit 42, the wireless reception unit 43, and the switches 44. The weight generation unit 46 generates weighting coefficients (weights) for signals transmitted/received via antennas 411, 412, and 413.

The configuration of the wireless transmission unit 42 is described in more detail. A transmission signal processing unit 421 performs various signal processes. For example, the transmission signal processing unit 421 performs a digital-to-analog conversion, an upconversion, and the like for signals received via the control unit 45. Also, the transmission signal processing unit 421 controls a transmission gain control unit 424 and the weight generation unit 46.

A transmission beamforming unit 423 has weighting units 4231, 4232, and 4233 and a distribution unit 4234. The weighting units 4231, 4232, and 4233 use the weighting coefficients outputted from the weight generation unit 46 to perform a weighting in relation to transmission signals. The distribution unit 4234 distributes the signal outputted from the transmission signal processing unit 421 to the antennas 411, 412, and 413.

The transmission gain control unit 424 controls transmission gains (amplification factors of variable amplifiers 425, 426, and 427) of the transmission signals for the antennas 411, 412, and 413. The variable amplifiers 425, 426, and 427 amplify the transmission signal based on the control from the transmission gain control unit 424.

The configuration of the wireless reception unit 43 is described in more detail. A reception signal processing unit 431 performs a downconversion, an analog-to-digital conversion, and the like for a signal outputted from transmission beamforming unit 423. The reception signal processing unit 431 can also use the weighting coefficients outputted from the weight generation unit 46 to perform a weighting in relation to signals received via the antennas 411, 412, and 413. The radar signal detection unit 432 detects a radar signal outputted from the weather radar 2 based on a signal outputted from the reception signal processing unit 431.

Figure 5:
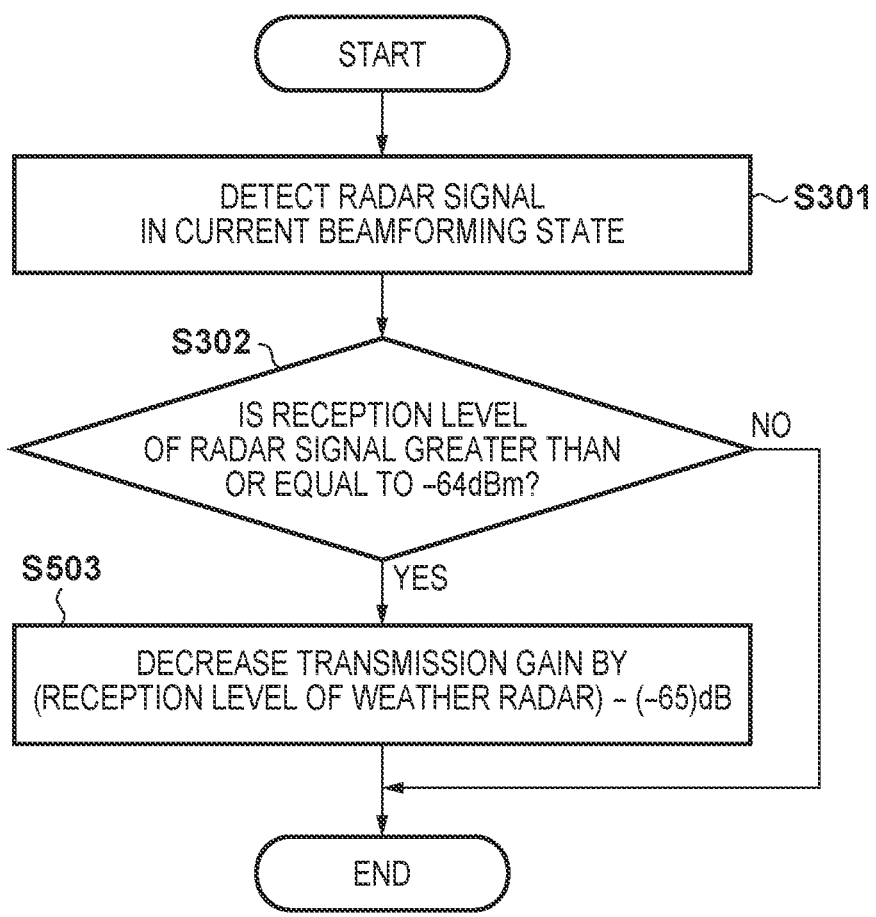
FIG. 5 is a flowchart for describing an operation in the second embodiment.

Next, an operation of the communication apparatus 1 in the present embodiment is described with reference to FIG. 5. FIG. 5 is a flowchart for describing an operation of the communication apparatus 1 in the present embodiment. Description is given of processing of step S503 because what is different to FIG. 3 of the first embodiment is that step S303 of FIG. 3 is replaced with step S503.

The transmission gain control unit 424 causes the transmission gain to decrease by (reception level of the radar signal)−(−65) dB in step S503. A case in which the reception level of the radar signal is −60 dBm is considered as one example. In such a case, the transmission gain control unit 424 decides that the transmission gain is to be decreased by −60−(−65)=5 dB. Assuming that the transmission gains prior to the decrease in all of the variable amplifiers 425, 426, and 427 is 20 dB, the transmission gains in the variable amplifiers 425, 426, and 427 are decreased 5 dB to 15 dB by the control of the transmission gain control unit 424.

In this way, in the present embodiment, the transmission gains change in accordance with the reception level of the received radar signal. Thus, even in a channel in which a radar signal can be received in a predetermined beamforming state, it becomes possible to continue to use the channel in the beamforming state by decreasing interference with the weather radar by changing the transmission gain.

Third Embodiment

A third embodiment will be described giving points of difference with the first and second embodiments. The configuration of the communication apparatus 1 in the present embodiment is the same as the configuration illustrated in FIG. 4 described in the second embodiment.

Figure 6:
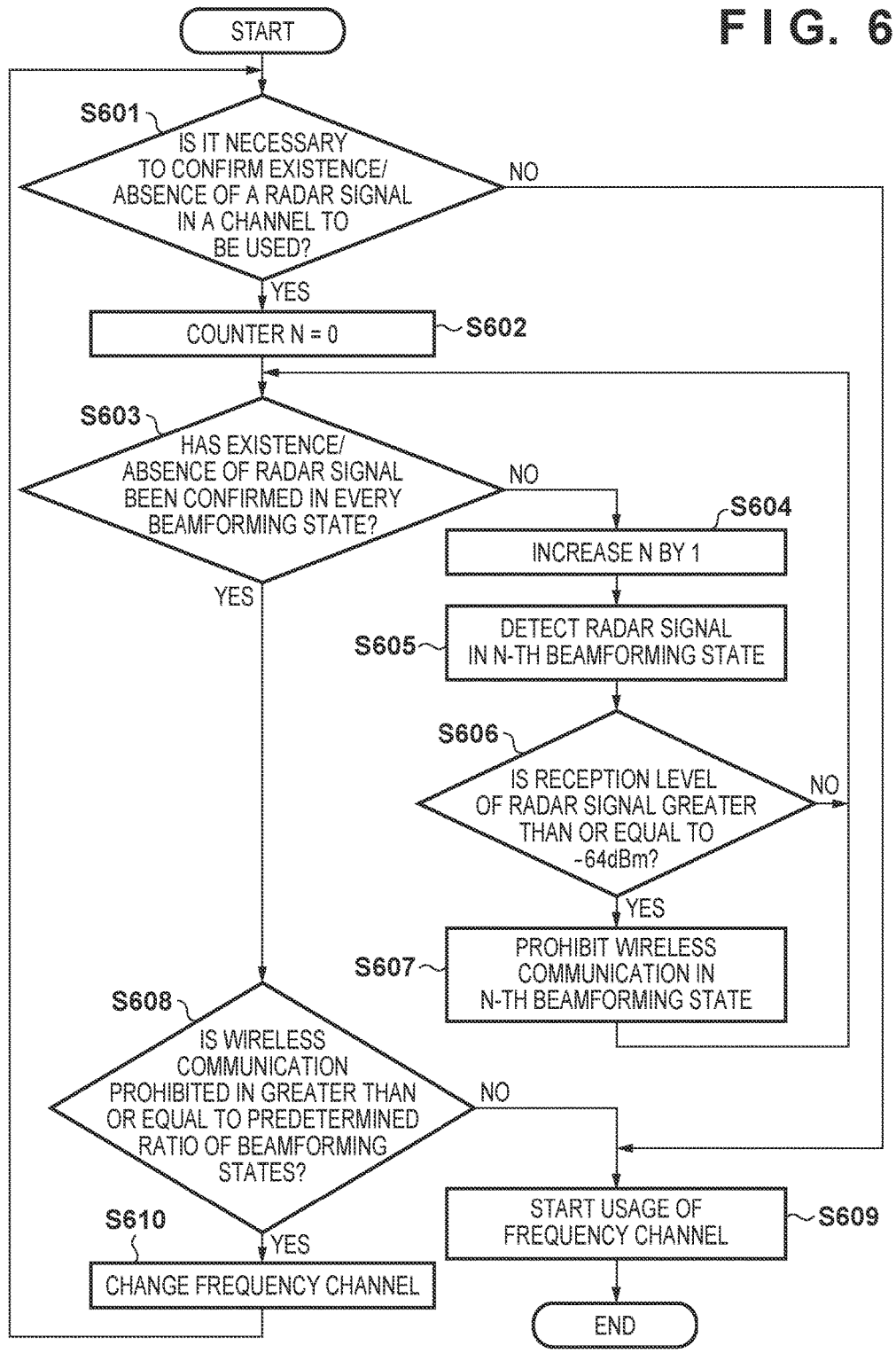
FIG. 6 is a flowchart for describing an operation in a third embodiment.

An operation of the communication apparatus 1 in the present embodiment is described with reference to FIG. 6. FIG. 6 is a flowchart for describing an operation of the communication apparatus 1 in the present embodiment. There are three sets of weightings for the antennas 411, 412, and 413 generated by the weight generation unit 46 in the present embodiment. Specifically, it is assumed that the communication apparatus 1 can take beamforming states of three patterns (first to third beamforming states).

The control unit 45, in step S601, determines whether or not it is necessary to confirm the existence or absence of a radar signal outputted from the weather radar 2 using a channel to be used. For example, the confirmation is not necessary for a frequency channel that does not interfere with the weather radar 2. The communication apparatus 1 starts using the frequency channel in a case when the confirmation is unnecessary (No in step S601). The control unit 45 sets a counter of the number of the beamforming state to 0 in step S602 in a case when the confirmation is necessary (Yes in step S601). This is to specify the beamforming states for which the radar signal existence or absence confirmation has been completed. Subsequently, in step S603, the control unit 45 selects the first to third beamforming states in order and determines whether or not the existence or absence of a radar signal has been confirmed in all the beamforming states.

The control unit 45 increases the counter N by 1 (step S604) in a case when the existence or absence of a radar signal in all the beamforming states has not yet been confirmed (No in step S603). Subsequently, the radar signal detection unit 432 detects a radar signal in the N-th beamforming state by control of the control unit 45 (step S605). In step S606, the reception signal processing unit 431 confirms whether or not the reception level of the radar signal detected by the radar signal detection unit 432 is greater than or equal to −64 dBm which is the threshold for executing the DFS function. The processing is returned to step S603 in a case when the reception level of the radar signal is less than the threshold (No in step S606). Also, the processing may also be returned to step S603 in a case when the radar signal detection unit 432 could not detect the radar signal in a fixed time in step S605. The control unit 45 prohibits a wireless communication in the N-th beamforming state in a case when the reception level of the radar signal is greater than or equal to the threshold (Yes in step S606) (step S607). After this, the processing is returned to step S603.

The control unit 45 determines (step S608) whether or not wireless communication is prohibited in greater than or equal to a predetermined ratio of the beamforming states (step S607) in a case when the existence or absence of a radar signal in each of the beamforming states is confirmed (Yes in step S603). This predetermined ratio is ½ in the present embodiment. The communication apparatus 1 starts using the frequency channel (step S609) in a case when wireless communication is not prohibited in greater than or equal to the predetermined ratio of beamforming states (No in step S608). Note, the communication apparatus 1 can select any state from among one or more beamforming states for which wireless communication is not prohibited in step S607. For example, the communication apparatus 1 can select a beamforming state in which a communication state can be more sufficiently maintained in relation to a terminal that performs a communication in the vicinity. Meanwhile, the communication apparatus 1 changes the frequency channel (step S610) in a case when wireless communication is prohibited in greater than or equal to the predetermined ratio of beamforming states (Yes in step S608), and performs the processing from step S601.

It is assumed as one example that the three beamforming states and the result of executing the process of FIG. 6 are as in Table 1 below.

TABLE 1

| Beamforming State | Reception Level of a Radar Signal | Usage Availability |
|---|---|---|
| 1 | (undetected) | can use |
| 2 | −55 dBm | usage prohibited |
| 3 | −70 dBm | can use |

As in Table 1, the reception level of the radar signal is −55 dBm in the second beamforming state and usage of the frequency channel to be used is prohibited in this state because step S606 of FIG. 6 is Yes. Meanwhile, in the first and third beamforming states, step S606 is No in FIG. 6 and usage of the frequency channel to be used is permitted, and therefore wireless communication is prohibited in a ratio of ⅓ of the beamforming states. Because the predetermined percentage in step S608 of FIG. 6 is ½, the determination of step S608 is No, the processing is advanced to step S609, and the communication apparatus 1 starts using the frequency channel.

In this way, in the present embodiment, if a determination as whether or not to use a frequency channel that could interfere with the weather radar 2 is made in a plurality of beamforming states, and the influence on the weather radar is found to be small, it is determined that usage is possible and usage is then started. By this, it becomes possible to use a frequency channel while decreasing the influence on the weather radar.

Fourth Embodiment

A fourth embodiment will be described giving points of difference with the first and second embodiments. The configuration of the communication apparatus 1 in the present embodiment is the same as the configuration illustrated in FIG. 2 described in the first embodiment.

Figure 7:
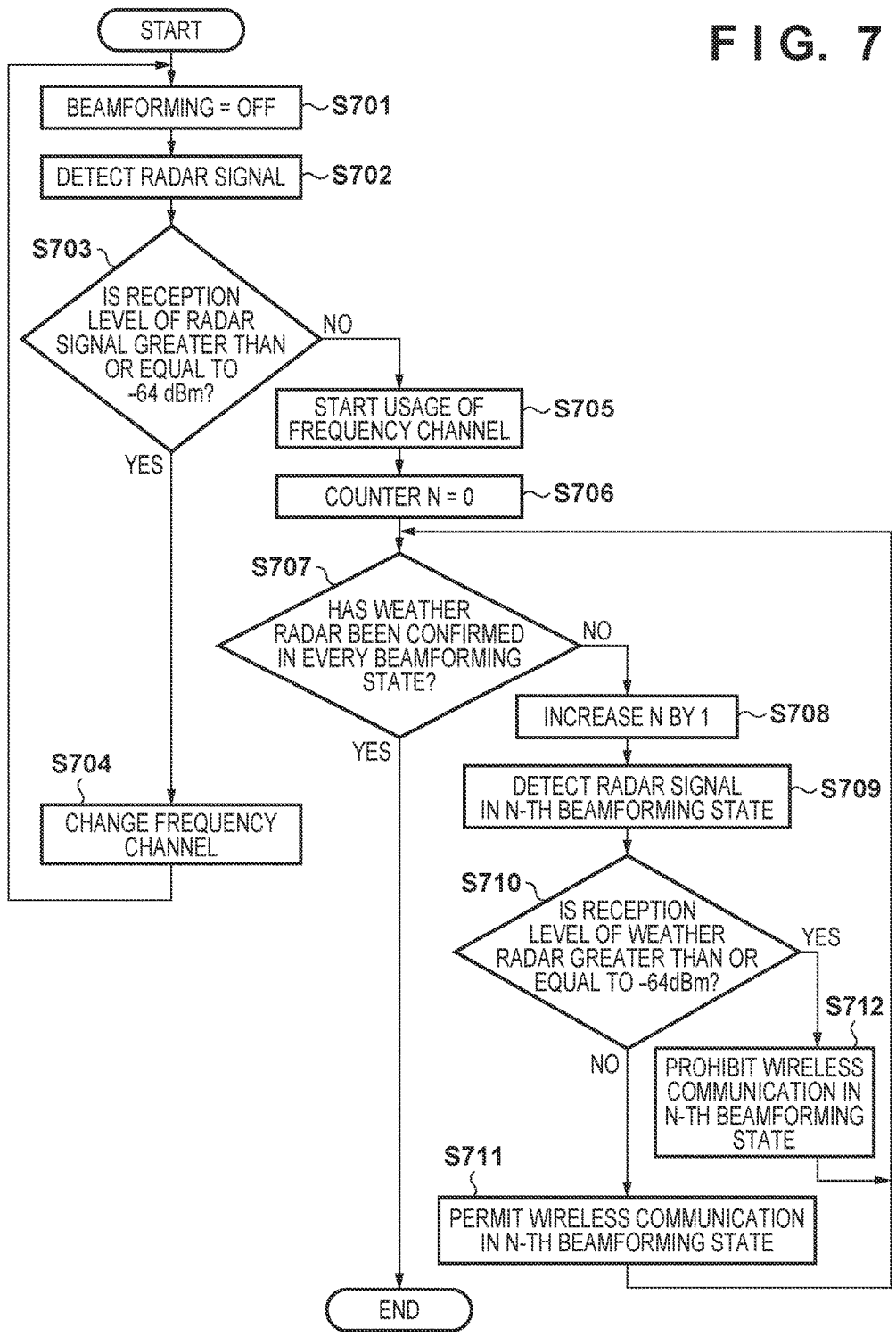
FIG. 7 is a flowchart for describing an operation in a fourth embodiment.

An operation of the communication apparatus 1 in the present embodiment is described with reference to FIG. 7. FIG. 7 is a flowchart for describing an operation of the communication apparatus 1 in the present embodiment. There are three sets of weightings for the antennas 111, 112, and 113 generated by the weight generation unit 123 in the present embodiment. Specifically, it is assumed that the communication apparatus 1 can take beamforming states of three patterns. Note, the three beamforming states are referred to as the first to third beamforming states in the description below.

The communication apparatus 1 turns the beamforming off in step S701. This is realized by the weighting coefficients generated by the weight generation unit 123 being 100, 0, and 0 for the antennas 111, 112, and 113 respectively for example. Subsequently, the radar signal detection unit 122, in step S702, detects a radar signal in the beamforming off state. The signal processing unit 121 confirms whether or not the reception level of the radar signal detected by the radar signal detection unit 122 is greater than or equal to −64 dBm which is the threshold for executing the DFS function. The control unit 13 changes the frequency channel to be used (step S704) and the processing is returned to step S701 in a case when the reception level of the radar signal is greater than or equal to the threshold (Yes in step S703). The communication apparatus 1 starts using the frequency channel (step S705) in a case when the reception level of the radar signal is less than the threshold (No in step S703). Also, the radar signal detection unit 122 may advance the processing to step S705 even in a case when the radar signal could not be detected in a fixed interval in step S702. The control unit 13 sets the counter of the number of the beamforming state to 0 in step S706 after usage of the frequency channel starts. This is to specify the beamforming states for which the radar signal existence or absence confirmation has been completed. Subsequently, in step S707, the control unit 13 selects the first to third beamforming states in order and determines whether or not the existence or absence of a radar signal has been confirmed in all the beamforming states.

The control unit 13 increases the counter N by 1 (step S708) in a case when the existence or absence of a radar signal in all the beamforming states has not yet been confirmed (No in step S707). Subsequently, the radar signal detection unit 122 detects a radar signal in the N-th beamforming state by control of the control unit 13 (step S709). In step S710, the signal processing unit 121 confirms whether or not the reception level of the radar signal detected by the radar signal detection unit 122 is greater than or equal to −64 dBm which is the threshold for executing the DFS function. The control unit 13 prohibits (step S712) a wireless communication in the N-th beamforming state in a case when the reception level of the radar signal is greater than or equal to the threshold (Yes in step S710), and thereafter, the processing is returned to step S707. The control unit 13 permits (step S711) a wireless communication in the N-th beamforming state in a case when the reception level of the radar signal is less than the threshold (No in step S710). After this, the processing is returned to step S707. Also, the wireless communication may be permitted in the N-th t beamforming state and the processing returned to step S707 even in a case when the radar signal detection unit 432 could not detect the radar signal in a fixed time in step S709.

It is assumed as one example that the three beamforming states and the result of executing the process of FIG. 6 are as in Table 2 below.

TABLE 2

| Beamforming State | Reception Level of a Radar Signal | Usage Availability |
|---|---|---|
| Beamforming off | −66 dBm | permitted |
| Pattern 1 | (undetected) | permitted |
| Pattern 2 | −55 dBm | not permitted |
| Pattern 3 | −70 dBm | permitted |

As in Table 2, in the second beamforming state 2, step S710 of FIG. 7 is No and usage of a wireless communication in the state is not permitted. Usage of the frequency channel is permitted in the first and third beamforming states among the three beamforming states.

In this way, in the present embodiment, the weather radar confirmation is performed in a beamforming off state prior to weather radar confirmation in each beamforming state. By this, a prompt start of an operation becomes possible and it is possible to prevent interference with respect to a weather radar.

Fifth Embodiment

A fifth embodiment will be described giving points of difference with the first and second embodiments. The configuration of the communication apparatus 1 in the present embodiment is the same as the configuration illustrated in FIG. 4 described in the second embodiment.

Figure 8:
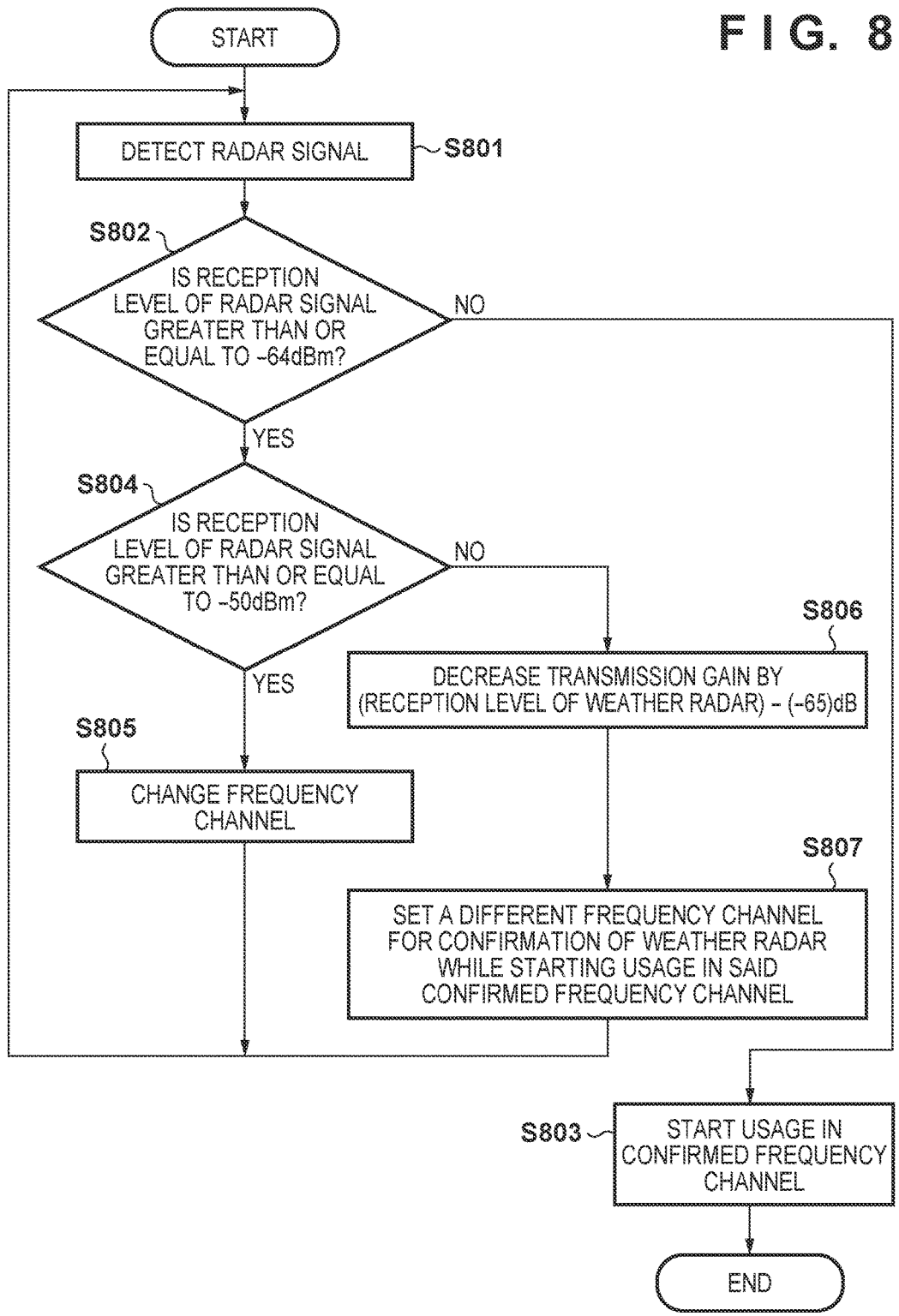
FIG. 8 is a flowchart for describing an operation in a fifth embodiment.

An operation of the communication apparatus 1 in the present embodiment is described with reference to FIG. 8. FIG. 8 is a flowchart for describing an operation of the communication apparatus 1 in the present embodiment. Similarly to the second embodiment, the communication apparatus 1 starts the processing illustrated in FIG. 8 in accordance with a radar signal being detected by the radar signal detection unit 122. Note, it is assumed that the weight generation unit 123 generates predetermined weighting coefficients and the communication apparatus 1 performs the processing illustrated in FIG. 8 in a state in which a beam is formed in accordance with the weighting coefficients (a current beamforming state) in the present embodiment.

In step S801, when in the communication apparatus 1, the radar signal detection unit 122 detects a radar signal in the current beamforming state in the channel to be used, the processing is advanced to step S802. The signal processing unit 121, in step S802, determines whether or not the reception level of the detected radar signal is greater than or equal to −64 dBm which is the threshold for executing the DFS function. The communication apparatus 1 starts using the channel (step S803) in the current beamforming state in a case when the reception level of the radar signal is less than the threshold (No in step S802).

The signal processing unit 121 determines whether or not the reception level of the detected radar signal is greater than or equal to −50 dBm in a case when the reception level of the radar signal is greater than or equal to the threshold (Yes in step S802). Note, −50 dBm is only an example, and it may be any level greater than or equal to −64 dBm at which the influence on the weather radar 2 is small when communication is actually performed. The control unit 45 determines that the reception level of the radar signal in a channel to be used is too large and changes the frequency channel (step S805) in a case when the reception level of the radar signal is greater than or equal to −50 dBm (Yes in step S804). After this, the processing is returned to step S801. The transmission gain control unit 424 causes the transmission gain to decrease by (the reception level of the radar signal)−(−65) dB in a case when the reception level of the radar signal is not greater than or equal to −50 dBm (No in step S804). Subsequently, the communication apparatus 1 starts usage of the channel in the current beamforming state and the control unit 45 sets a frequency channel different to the frequency channel whose usage was started for confirmation of the existence or absence of a radar signal in step S807. This is because there is the possibility that the communication apparatus 1 can use the different frequency channel if the existence or absence of a radar signal is not confirmed in the different frequency channel. After this, the processing is returned to step S801.

In this way, it becomes possible to use the same frequency channel as the weather radar 2 by lowering the reception level of the radar signal to a level that does not influence the weather radar in the present embodiment. By this, a prompt start of an operation becomes possible and it is possible to prevent interference with respect to a weather radar.

Note, the communication apparatus 1 is not limited to executing operation from the confirmation of the existence or absence of a radar signal until the start of usage of a frequency channel only at a time of a power supply activation of the communication apparatus in the embodiment described above. For example, the communication apparatus 1 may execute such an operation periodically and may execute it upon a change of a radio wave propagation state or the like.

Also, the methods of the first and second embodiments can be applied to the third to fifth embodiments. For example, the communication apparatus 1 may adjust the transmission/reception beam gain or the transmission gain and again perform a determination of the reception level after the adjustment (step S606) in step S607 of FIG. 6 (third embodiment). Then, it may be such that the communication apparatus 1 does not set usage of the corresponding frequency channel to be prohibited if the reception level is not greater than or equal to the threshold. Such control can be applied in step S704 and step S712 of FIG. 7 (fourth embodiment) and step S805 and step S806 (with regards to the transmission/reception beam gain) of FIG. 8 (fifth embodiment). Also, the processing of step S701 to step S704 of FIG. 7 described in the fourth embodiment can be applied to the fifth embodiment (FIG. 8).

Also, although the threshold for executing the DFS function is described as −64 dBm in the foregoing embodiments, but the threshold is not limited to −64 dBm if it is for executing the DFS function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-114714, filed Jun. 8, 2016 which is hereby incorporated by reference herein in its entirety.

What is claimed is:

1. A communication apparatus having a plurality of antennas, comprising:
   a communication unit configured to use a predetermined frequency channel to perform communication;
   an adjustment unit configured to adjust beamforming for transmission/reception by setting a weighting coefficient for each of the plurality of antennas;
   a detection unit configured to monitor to detect a radar signal outputted from another communication apparatus by using the predetermined frequency channel in a beamforming state formed in accordance with the weighting coefficients; and
   a determination unit configured to determine whether or not a reception level of the radar signal detected by the detection unit is greater than or equal to a predetermined threshold, wherein
   in a case when it is determined by the determination unit that the reception level of the radar signal detected by the detection unit is greater than or equal to the predetermined threshold, the adjustment unit changes the weighting coefficients, and
   the communication unit uses the predetermined frequency channel in a beamforming state formed in accordance with the changed weighting coefficients to perform communication.

2. The communication apparatus according to claim 1, wherein the adjustment unit, in a case when it is determined by the determination unit that the reception level of the radar signal detected by the detection unit is greater than or equal to the predetermined threshold, multiplies the weighting coefficients with a relative ratio of a difference between the reception level and the predetermined threshold.

3. The communication apparatus according to claim 1, further comprising:
   a control unit configured to control a transmission gain of a transmission signal outputted from each of the plurality of antennas, wherein
   the control unit decreases the transmission gain in a case when it is determined by the determination unit that the reception level of the radar signal detected by the detection unit is greater than or equal to the predetermined threshold.

4. The communication apparatus according to claim 3, the control unit decreases the transmission gain in proportion to a difference between the reception level and the predetermined threshold in a case when it is determined by the determination unit that the reception level of the radar signal detected by the detection unit is greater than or equal to the predetermined threshold.

5. The communication apparatus according to claim 1, wherein the determination unit, in a case when it is determined that the reception level of the radar signal detected by the detection unit is greater than or equal to the predetermined threshold, determines whether or not the reception level of the detected radar signal is greater than or equal to another threshold whose level is higher than the predetermined threshold, and
   the adjustment unit causes the weighting coefficients to decrease in a case when it is determined by the determination unit that the reception level of the detected radar signal is less than the another threshold.

6. The communication apparatus according to claim 5, wherein the detection unit, in a case when it is determined by the determination unit that the reception level of the radar signal detected by the detection unit is greater than or equal to the another threshold, monitors the radar signal outputted from the another communication apparatus using another frequency channel different to the frequency channel.

7. The communication apparatus according to claim 1, wherein the adjustment unit configures weighting coefficients of a plurality of patterns for each of the plurality of antennas, and
   the detection unit monitors to detect the radar signal outputted from the another communication apparatus by using the predetermined frequency channel in a plurality of beamforming states formed in accordance with the weighting coefficients of the plurality of patterns.

8. The communication apparatus according to claim 7, wherein the detection unit uses another frequency channel, different from the frequency channel, to monitor a radar signal outputted from the another communication apparatus in a case when it is determined by the determination unit that the reception level of the radar signal detected by the detection unit is greater than or equal to the predetermined threshold in a fixed ratio of beamforming states out of the plurality of beamforming states.

9. The communication apparatus according to claim 7, wherein, in a case when it is determined by the determination unit that the reception level of the radar signal detected by the detection unit is less than the predetermined threshold in a fixed proportion of beamforming states out of the plurality of beamforming states, the communication unit uses the predetermined frequency channel to perform communication in a beamforming state formed by the reduced weighting coefficients.

10. The communication apparatus according to claim 7, wherein the communication unit, in a case when it is determined by the determination unit that the reception level of the radar signal detected by the detection unit is less than the predetermined threshold in a selected beamforming state out of the plurality of beamforming states, uses the predetermined frequency channel to perform communication in the selected beamforming state.

11. The communication apparatus according to claim 7, wherein in a case when a radar signal outputted by the another communication apparatus is detected by the detection unit using the predetermined frequency channel in a state without beamforming, and it is determined by the determination unit that the reception level of the radar signal detected in the state without beamforming is greater than or equal to the predetermined threshold, the detection unit uses another frequency channel, different from the frequency channel, to monitor a radar signal outputted from the another communication apparatus.

12. The communication apparatus according to claim 7, wherein in a case when a radar signal outputted by the another communication apparatus is detected by the detection unit using the predetermined frequency channel in a state without beamforming, and it is determined by the determination unit that the reception level of the radar signal detected in the state without beamforming is less than the predetermined threshold, the adjustment unit sets a plurality of patterns of weighting coefficients in relation to the plurality of antennas.

13. The communication apparatus according to claim 12, wherein the detection unit monitors to detect the radar signal outputted from the another communication apparatus by using the predetermined frequency channel in a plurality of beamforming states formed in accordance with the weighting coefficients of the plurality of patterns, and the communication unit, in a case when it is determined by the determination unit that the reception level of the radar signal detected by the detection unit is less than the predetermined threshold in a selected beamforming state out of the plurality of beamforming states, uses the predetermined frequency channel to perform communication in the selected beamforming state.

14. A method of controlling a communication apparatus having a plurality of antennas, comprising:

using a predetermined frequency channel to perform communication;

adjusting beamforming for transmission/reception by setting a weighting coefficient for each of the plurality of antennas;

monitoring to detect a radar signal outputted from another communication apparatus by using the predetermined frequency channel in a beamforming state formed in accordance with the weighting coefficients; and determining whether or not a detected reception level of the radar signal is greater than or equal to a predetermined threshold, wherein in a case when it is determined that the detected reception level of the radar signal is greater than or equal to the predetermined threshold, the weighting coefficients are changed, and the communication is performed using the predetermined frequency channel in a beamforming state formed in accordance with the changed weighting coefficients.

15. A non-transitory computer-readable storage medium storing a computer program for causing a computer to execute a control method of a communication apparatus, the method comprising:

using a predetermined frequency channel to perform communication;

adjusting beamforming for transmission/reception by setting a weighting coefficient for each of the plurality of antennas;

monitoring to detect a radar signal outputted from another communication apparatus by using the predetermined frequency channel in a beamforming state formed in accordance with the weighting coefficients; and determining whether or not a detected reception level of the radar signal is greater than or equal to a predetermined threshold, wherein in a case when it is determined that the detected reception level of the radar signal is greater than or equal to the predetermined threshold, the weighting coefficients are changed, and the communication is performed using the predetermined frequency channel in a beamforming state formed in accordance with the changed weighting coefficients.

* * * * *